(12) United States Patent
Rafnsson

(10) Patent No.: US 8,484,663 B2
(45) Date of Patent: Jul. 9, 2013

(54) METHOD OF DERIVING WEB SERVICE INTERFACES FROM FORM AND TABLE METADATA

(75) Inventor: Rognvaldur Kristinn Rafnsson, Reykjavik (IS)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 11/741,318

(22) Filed: Apr. 27, 2007

(65) Prior Publication Data

US 2008/0271047 A1    Oct. 30, 2008

(51) Int. Cl.
*G06F 3/00*     (2006.01)
*G06F 15/16*    (2006.01)

(52) U.S. Cl.
USPC ............ 719/320; 719/313; 719/311; 709/203

(58) Field of Classification Search
None
See application file for complete search history.

(56) References Cited

U.S. PATENT DOCUMENTS

| | | | |
|---|---|---|---|
| 7,080,092 B2 * | 7/2006 | Upton ........................... | 719/311 |
| 7,085,762 B2 | 8/2006 | Medicke et al. | |
| 7,103,627 B2 * | 9/2006 | Kittredge et al. ............. | 719/311 |
| 7,467,391 B2 * | 12/2008 | Myllymaki et al. .......... | 719/320 |
| 7,480,920 B2 * | 1/2009 | Brendle et al. ................ | 719/320 |
| 2002/0065800 A1 | 5/2002 | Morlitz | |
| 2002/0116394 A1 | 8/2002 | Van Doorn | |
| 2002/0120719 A1 * | 8/2002 | Lee et al. ...................... | 709/203 |
| 2003/0144892 A1 | 7/2003 | Cowan et al. | |
| 2004/0024875 A1 * | 2/2004 | Horvitz et al. ................ | 709/226 |
| 2004/0064428 A1 | 4/2004 | Larkin et al. | |
| 2004/0128269 A1 | 7/2004 | Milligan et al. | |
| 2004/0181771 A1 * | 9/2004 | Anonsen et al. .............. | 717/100 |
| 2004/0268229 A1 * | 12/2004 | Paoli et al. .................... | 715/508 |
| 2005/0005158 A1 * | 1/2005 | Alaluf ............................ | 713/200 |
| 2005/0038867 A1 | 2/2005 | Henderson et al. | |
| 2005/0050141 A1 * | 3/2005 | An et al. ........................ | 709/203 |
| 2005/0050173 A1 * | 3/2005 | Kikuchi ........................ | 709/219 |
| 2005/0091386 A1 * | 4/2005 | Kuno et al. ................... | 709/228 |
| 2005/0102308 A1 | 5/2005 | Sykes et al. | |
| 2005/0125529 A1 | 6/2005 | Brockway et al. | |
| 2005/0283478 A1 * | 12/2005 | Choi et al. ........................ | 707/9 |
| 2006/0136351 A1 | 6/2006 | Angrish et al. | |
| 2006/0173892 A1 | 8/2006 | Beck | |
| 2006/0174252 A1 * | 8/2006 | Besbris et al. ................ | 719/313 |

(Continued)

FOREIGN PATENT DOCUMENTS

| | | |
|---|---|---|
| JP | 2001-265722 | 9/2001 |
| JP | 2005-148823 A | 6/2005 |

(Continued)

OTHER PUBLICATIONS

"A Dynamic Services Discovery Framework for Traversing Web Services Representation Chain", Qun Zhou, 2004, pp. 1-8.*

(Continued)

*Primary Examiner* — Tuan Dao
(74) *Attorney, Agent, or Firm* — Hope Baldauff, LLC

(57) ABSTRACT

A system and method of deriving web service interfaces from form and table metadata is disclosed. The method uses a discovery subsystem to discover services that are available on an application server, retrieves the metadata descriptions of the services on the application server and uses the services discovered and the metadata descriptions to create web services interfaces such that the service is available using web services description language.

12 Claims, 4 Drawing Sheets

U.S. PATENT DOCUMENTS

| | | | |
|---|---|---|---|
| 2006/0235976 | A1 | 10/2006 | Chen et al. |
| 2006/0242181 | A1 | 10/2006 | Mueller-Klingspor |
| 2007/0011605 | A1 | 1/2007 | Dumitru et al. |
| 2007/0067384 | A1* | 3/2007 | Angelov ................. 709/203 |
| 2007/0073751 | A1* | 3/2007 | Morris et al. ............. 707/101 |
| 2007/0255717 | A1* | 11/2007 | Baikov et al. ................ 707/10 |
| 2007/0256083 | A1* | 11/2007 | Vayssiere ................. 719/320 |
| 2007/0271107 | A1* | 11/2007 | Fiedler et al. ................ 705/1 |
| 2007/0276815 | A1* | 11/2007 | Naibo et al. .................... 707/3 |

FOREIGN PATENT DOCUMENTS

| | | |
|---|---|---|
| JP | 2005-522103 A | 7/2005 |
| RU | 2364925 C2 | 1/2006 |
| WO | WO 03/084186 A1 | 10/2003 |

OTHER PUBLICATIONS

"Web Service Interface", Dirk Beyer, 2005, pp. 1-12.*

"Developers Guide to Building XML-based Web Services", James Kao, 2001, pp. 1-21.*

"The Web Service Discovery Architecture" Wolfgang Hoschek, 2002, pp. 1-15.*

Nadkarni et al., "WebEAV: Automatic Metadata-driven Generation of Web Interfaces to Entity-Attribute-Value Databases," J Am Med Inform Assoc. 200;7:343-356, http://www.pubmedcentral.nih.gov/picrender.fcgi?artid=61439&blobtype=pdf, Jul./Aug. 2000.

"Execution Service Interfaces," Global Grid Forum, 2006, http://portal.etsi.org/docbox/Workshop/GRID/GRID25%20draft-ggf-esi-1.0.doc.

"QCDGrid2 Metadata Catalogue Web Service Specification," http://www.gridpp.ac.uk/qcdgrid/documents/work_package_3/qcdgrid2-mdcws-specification.pdf, Nov. 29, 2005.

Written Opinion for PCT/US2008/059197 mailed Sep. 26, 2008.

International Search Report for PCT/US2008/059197 mailed Sep. 26, 2008.

Chinese Official Action dated Jul. 21, 2011 in Chinese Application No. 200880013483.1.

Australian Official Action dated Feb. 28, 2012 in Australian Application No. 2008245976.

Australian Notice of Allowance dated May 31, 2012 in Australian Application No. 2008245976.

Chinese Official Action dated May 28, 2012 in Chinese Application No. 200880013483.1.

Russian Notice of Allowance dated Apr. 19, 2012 in Russian Application No. 2009139653/08(056186).

Yoshimatsu, Fumiaki, "Web Service Integration and Approach of each Company," Feb. 1, 2003, XML Business white paper, Shoeisha Co., Ltd., Japan, vol. 12, pp. 144-151.

Russian Official Action dated Feb. 1, 2012 in Russian Application No. 2009139653.

Japanese Official Action dated Mar. 27, 2012 in Japanese Application No. 2010-506373.

European Search Report dated Sep. 30, 2011 in European Application No. 08744974.0.

Al-Rawahi et al., "Approaches to Identify and Develop Web Services as Instance of SOA Architecture," Jun. 13-15, 2005 Proceedings of the International Conference on Services Systems and Services Management (ICSSSM '05), vol. 1,pp. 579-584.

Garofalakis et al., "Web Service discovery Mechanisms: Looking for a Needle in a Haystack?" Aug. 10, 2004, International Workshop on Web Engineering, 14 pages.

Chinese Official Action dated Dec. 28, 2012 in Chinese Application No. 200880013483.1.

Israeli Official Action dated Nov. 11, 2012 in Israeli Application No. 200836.

* cited by examiner

METHOD OF DERIVING WEB SERVICE INTERFACES FROM FORM AND TABLE METADATA

BACKGROUND

This Background is intended to provide the basic context of this patent application and it is not intended to describe a specific problem to be solved.

Computer applications that are designed to work in one environment often are needed to work in a different environment. For example, a computer application may be designed to be installed on a hard drive of a computer such that the data is readily available. However, as times change, a different environment may be desired. For example, it may be desirable to have an application available over the Internet in which case the application would not be installed on every hard drive on every computer that is using the application. Modifying the application to be available over the Internet requires careful review and modification, although data is available that describes the forms and tables used in the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Many applications are data driven applications where abstractions of the data such as forms and tables are the driving forces of the applications design. Considerable effort has gone into defining the metadata behind those abstractions (tables, forms, etc.) in applications. The metadata describes an interface to the applications such as what fields are meaningful and what interactions are available. For example, metadata for a sales order form contains the fields for a header (buyer, date, delivery terms, etc.) and the lines to create the form. The metadata may also contain what the user can do with the form such as save, post, ship, etc. By using this data, programmatic access may be granted using simple object access protocol or SOAP.

A system and method of deriving web service interfaces from form and table metadata is disclosed. The method uses a discovery subsystem to discover services that are available on an application server. The method retrieves the metadata descriptions of the services on the application server. The method uses the services discovered and the metadata descriptions to create web services interfaces such that the service is available using web services description language.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
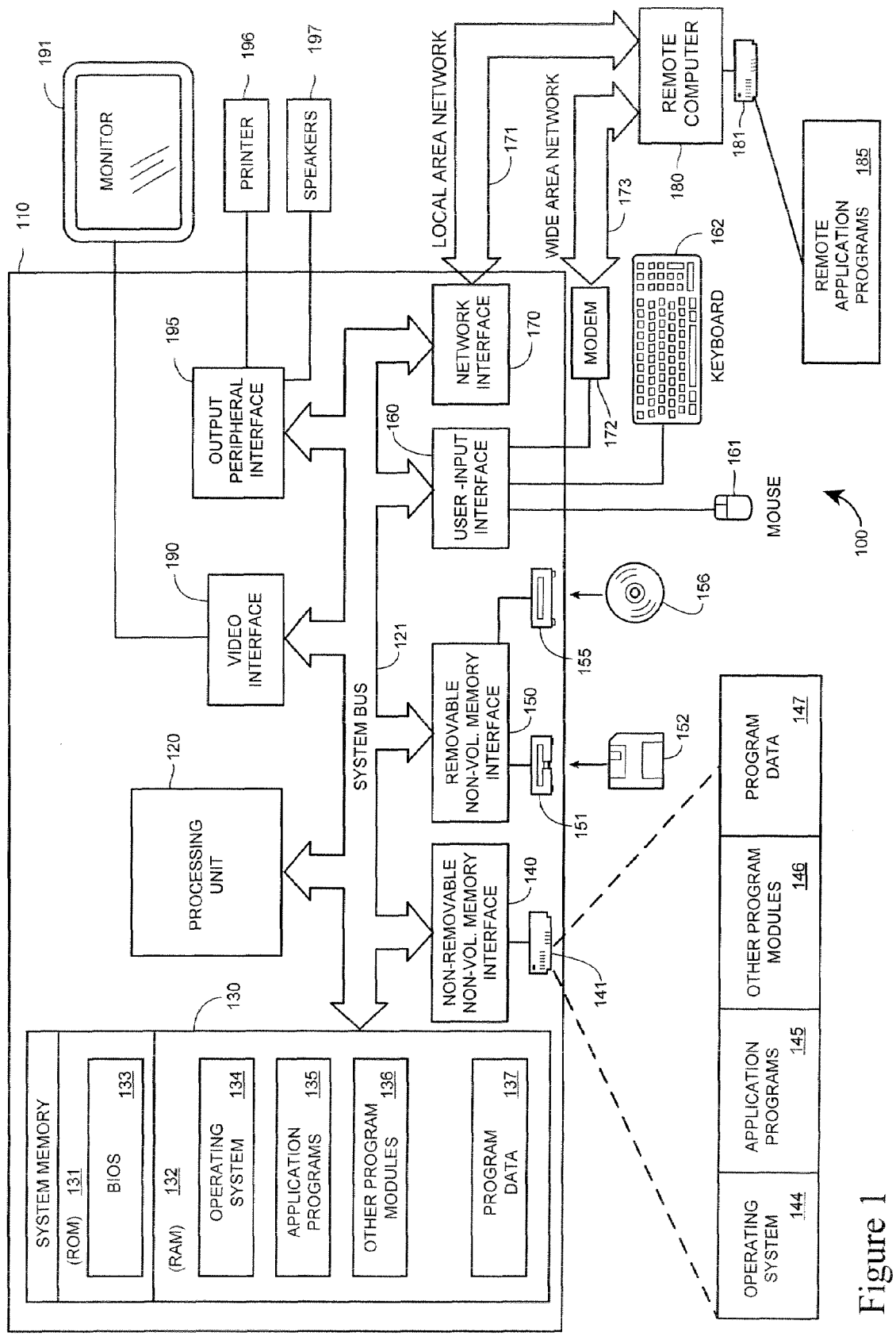
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by Computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
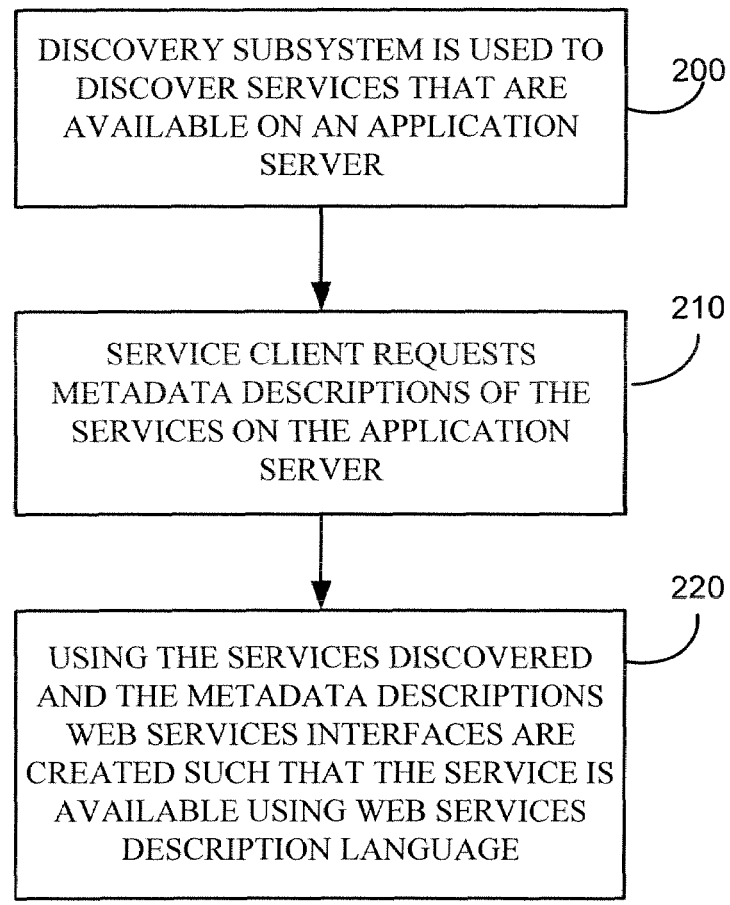
FIG. 2 is an illustration of a flowchart of a method of deriving web service interfaces from form and table metadata.

FIG. 2 is an illustration of a method of deriving web service interfaces from form and table metadata. As more and more applications are being shifted from being locally based to web based, there has been a need to automate the process of converting locally based applications to applications that are available over a broader network, such as the Internet. Most business applications are data driven applications where abstractions of the data such as forms and tables are the driving forces of the applications' design. Considerable effort has gone into defining the metadata behind those abstractions (tables, forms, etc.) in applications. The metadata describes an interface to the applications such as what fields are meaningful and what interactions are available. For example, metadata for a sales order form contains the fields for a header (buyer, date, delivery terms, etc.) and the lines to create the form. The metadata may also contain what the user can do with the form such as save, post, ship, etc this might be represented as a button or menu option on a form or by other means. By using this data, programmatic access may be granted using simple object access protocol or SOAP.

In some applications, tables may be considered the lowest level of abstraction. For example, a table may define a set of fields that are related to an entity and those fields may contain value or be calculated from values both with in this table or other tables. Field also may have properties such as type of value (string, integer, etc.) and its size (string length of 50, for example). In addition, a table also may include indices to optimize finding of entities and triggers/events for validation logic on insert, update and delete.

Code unit abstraction is a standard method oriented procedural abstraction that defines an interface to a method in a manner similar to program languages like visual basic.

Form abstraction defines user interfaces for an application. Form abstraction groups together fields for users and only shows the fields that are relevant for the user. Form abstraction may also provide the means for a user to interact with the data such as view, insert and modify as well as access to the functionality of the system such as posting an order or generating a shipment notice. The form defines the external view for an entity (such as a sales order), it defines the fields in the view and if the view permits or allows functions such as read, modify, insert, delete as well as defining what fields are read only and what fields are editable. By deriving from, the user interface for an application, the application may be made available using remote technology such as web service technology.

Figure 3:
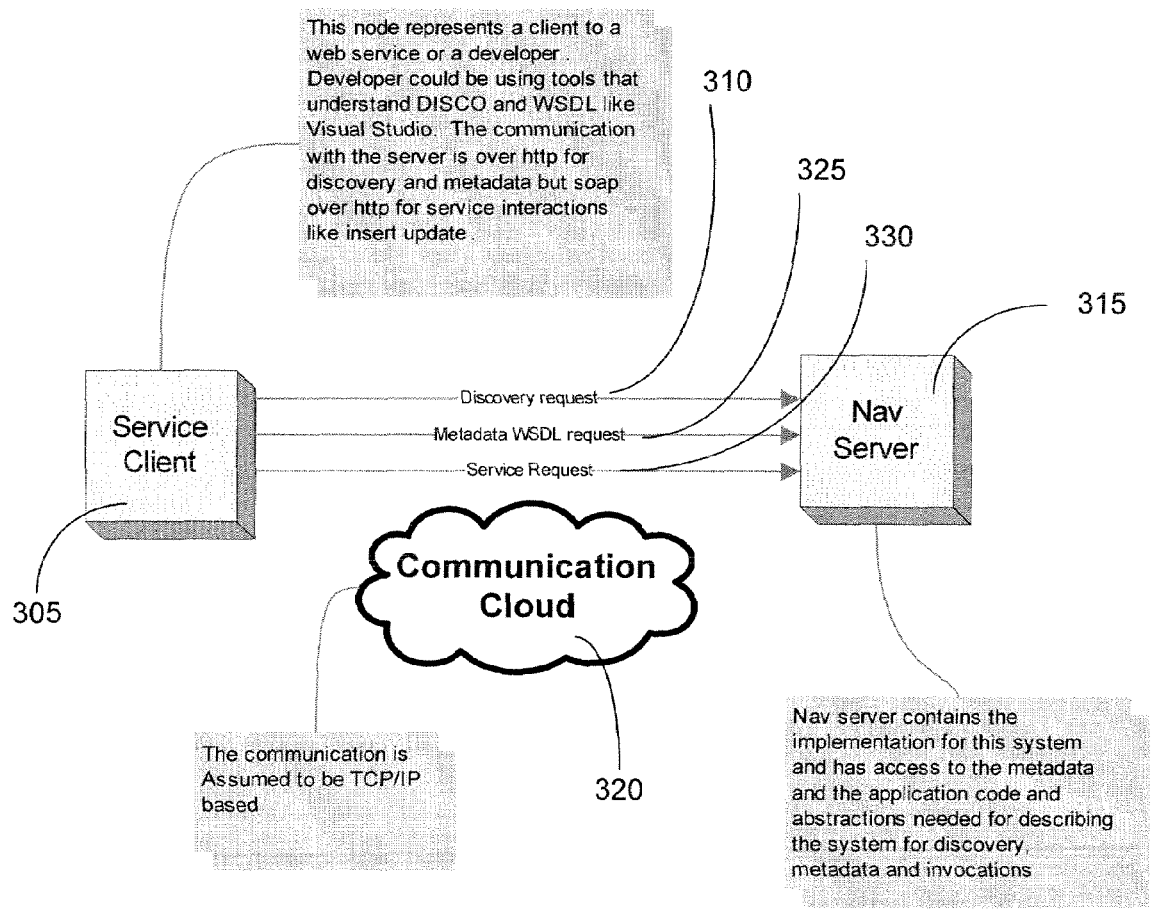
FIG. 3 is an illustration of system that implements the method of FIG. 2.

Referring again to FIG. 2, at block 200, a discovery subsystem may be used to discover services that are available on an application server. FIG. 3 may be an illustration of a sample system deployment of the method. A service client 305 may be a consumer or developer of the service. The service client 305 may communicate a discovery request 310 to a server 315 of the application through the communication cloud 320. In one embodiment, the communication cloud is the internet and the communication occurs using http over TCP/IP. Of course, other embodiments are possible. For example, the client and server could be local, such as on an intranet.

At block 210, the service client 305 (FIG. 3) may request metadata descriptions 325 of the services on the application server 315. The server 315 may return the metadata request 325 using the communication cloud 320. In another embodiment, the metadata is retrieved using a web services definition language request. Service requests 330 may also use the communication cloud 320.

At block 220, the services discovered 310 and the metadata descriptions 325 are used to create web services interfaces such that the service is available using web services description language. Communication from the service client to the application server may use soap over http for service interactions such as insert and update.

Figure 4:
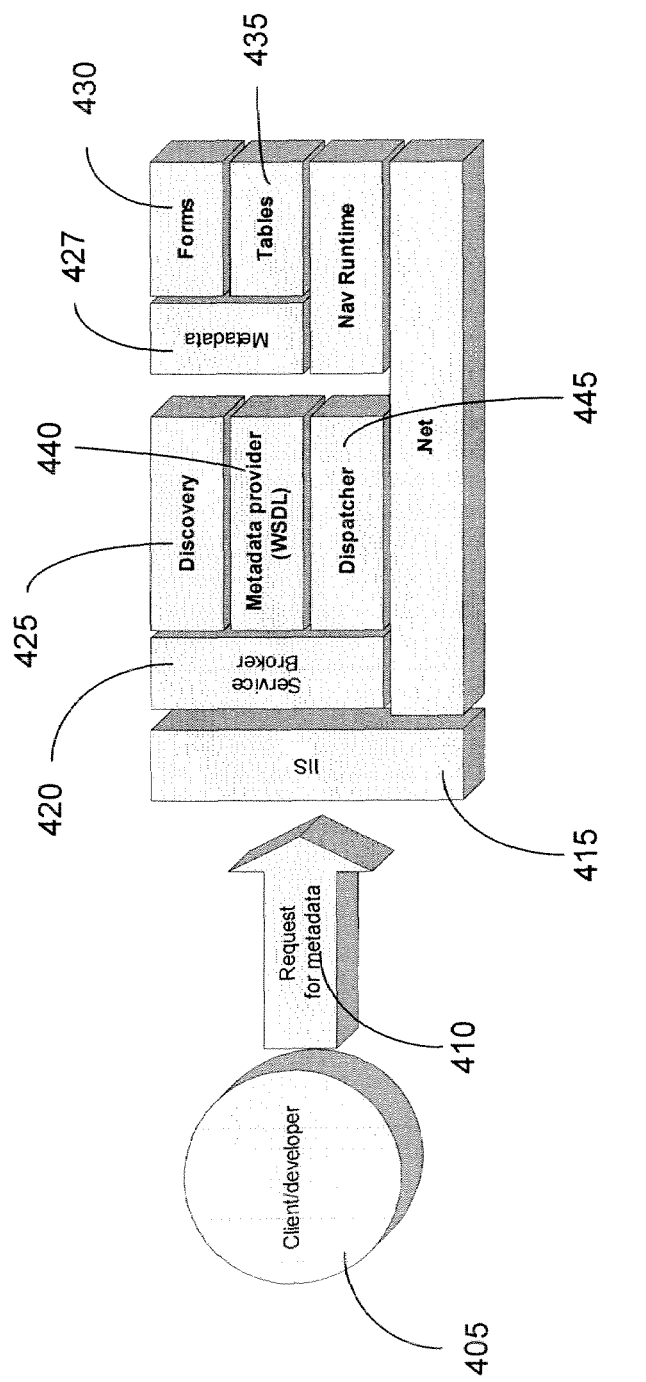
FIG. 4 is an illustration of the parts of the method that assist in implementing the system.

FIG. 4 is an illustration of how the various requests may be handled. As previously mentioned, a client or developer 405 may request metadata 410 from an application. The request may be delivered by the server infrastructure (IIS) 415 to the service broker 420. The service broker 420 may then determine what type of request it is and then route to an applicable subsystem. The individual subsystems handle the requests.

One subsystem is the discovery subsystem 425. The discovery subsystem allows clients/developers to discover what services are available from the system. The response may be in a variety of formats including the DISCO format from Microsoft Corporation. Once a Web Service has been deployed, potential users must be able to discover where it is and how it works. DISCO is a Microsoft® technology for publishing and discovering Web Services, Universal Description, Discovery, and Integration (UDDI) is an industry-wide initiative that defines a SOAP-based protocol for updating and querying Web Service information repositories. Like DISCO, UDDI makes it possible to publish and discover a Web Service, maximizing the site's reach and ultimate success.

The Web Service Description Language (WSDL) is an ongoing initiative that's attempting to standardize how Web Services can be described in XML format. A WSDL document describes a service's operations in terms of messages and (typically) XML Schema type definitions, as well as how they are bound to various protocols and endpoints. Once a client can get its hands on a WSDL document, it should have enough information to know how to interact with the target Web Service. If the client knows where the WSDL document resides, it can simply ask for it via HTTP. However, if the client doesn't know where the WSDL lives, a discovery mechanism is needed.

Discovery with DISCO

In the past, most consumers found out about new Web Services (and their endpoint addresses) by browsing the Web, receiving an e-mail, or by word-of-mouth. DISCO can define a document format along with an interrogation algorithm, making it possible to discover the Web Services exposed on a given server. DISCO also makes it possible to discover the capabilities of each Web Service (via documentation) and how to interact with it (via WSDL). To publish a deployed Web Service using DISCO, a user needs to register a service with in application server.

The .disco response is an XML document that simply contains links to other resources that describe the Web Service, much like an HTML file that contains human-readable documentation or a WSDL file containing the interface contract.

Abstractions from the data underlying the application that is intended to be web accessible as a web-service such as forms 430 and tables 435 are registered in a database table. The discovery subsystem 425 is populated from the database table. Each record in the database becomes a web service entry with in DISCO response in the response if a user has marked it as a service. Each entry in the response may contain a uniform resource locator (url) pointing to the web services description language (wsdl) description of the service.

METADATA Provider

The metadata provider 440 may provide the description of the service interface that may be used by standard tools such as tools that can understand the WSDL format. A client/developer may request a description of a specific service. The system loads the metadata 427 that describes this service such as the forms 430 and tables 435. The metadata 427 is then used to define the value types that are passed to the service as well as the messages.

The value type part of the WSDL is derived from metadata 427 described both on forms 430 and tables 435. The system starts by loading the form metadata 427 and the form metadata 427 holds information about what tables 435 to which the form 430 saves data. The form 430 metadata 427 also points out what fields from the tables 435 are shown on the form 430. The table metadata 437 contains the fields and their properties like type (and size) and name. An xml type is built from this metadata information 427 in addition to the name of the service. The name of the service forms the name of the value type, then each field on the form show up as field on the value type where the name and type of the field is used.

Say an application has a table 435.

```
table id=1 => Customers {
   field id=1 => Name:string(100),
   field id=2 => TelephoneNumber:string(16),
   field id=3 => Rating:int
}
And a form 430:
form id=2 => CustomerCard{
     table-ref 1,
     field-ref 1,
     field-ref 2,
   can-read true,
     can-insert true,
     can-modify true,
     can-delete false
}
```

This form 430 can insert a new record in table Customers. This form 430 also can edit and read fields Name and TelephoneNumber but it can not delete a record nor read or edit the Rating field. It would be desirable to have access to this view/form 430 as a programmatic construct. To do so, the view/form 430 may be registered as a service.

Register Form:2 as Customer

By registering the form 430 CustomerCard as a service, the WSDL description may be retrieved and services may be invoked described in the WSDL. The WSDL file contains following information:

The methods: Find, Insert, Update and Get,

It contains a type called Customer that has 2 fields: Name and TelephoneNumber.

This type is the parameter to the methods.

Dispatcher

The dispatcher 445 receives the actual service requests. The service request is formatted to the specification provided in WSDL provided by metadata provider 440. The basic operation of the dispatcher 445 is to dispatch a message by virtually filing out the form 430 and invoking the right methods of the form 430 or fill out the response with information from the form 430.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of deriving web service interfaces from form and table metadata comprising:
   receiving from a service client at a discovery subsystem a first request for services that are available on an application server;
   responding to the first request with a web service entry corresponding to a form registered in a database table as a service, wherein the form defines
      a user interface of an application,
      an external view of an entity,
      which fields are visible in the external view of the entity,
      whether the external view of the entity allows one of a read, a modify, an insert and a delete function to be operated on the entity, and
      whether particular fields in the external view of the entity are one of read-only or editable;
   receiving from the service client a second request for a description of the service;
   retrieving form metadata regarding the form on the application server;
   determining from the form metadata what fields from what tables are shown on the form;
   retrieving table metadata regarding properties of the fields, wherein each of the fields shown on the form appears as a field in the XML type using a name and type of the field from the table metadata; and
   using the form metadata and the table metadata to respond to the second request with a description of the service in the Web Services Definition Language (WSDL) format.

2. The method of claim 1, wherein the second request comprises a WSDL request.

3. The method of claim 1, further comprising receiving the first request and the second request at the application server using the Hypertext Transport Protocol (HTTP) and receiving simple object access protocol (SOAP) requests for service interactions including insert and update.

4. The method of claim 1 wherein the web service entry is in a web service discovery tool format known as DISCO format.

5. The method of claim 1 wherein abstractions intended to be web accessible as a web-service are registered in the database table.

6. The method of claim 5, wherein the discovery subsystem is populated from the database table.

7. The method of claim 1, wherein the web service entry in the response contains a Uniform Resource Locator (URL) pointing to a WSDL description of the service.

8. The method of claim 1, wherein an XML type is built from the form metadata and the table metadata and a name of the service.

9. A computer readable storage medium comprising computer executable code for deriving web service interfaces from form and table metadata, wherein the computer code further comprises code for:
   receiving from a service client at a discovery subsystem a first request for services that are available on an application server;
   responding to the first request with a web service entry corresponding to a form registered in a database table as a service, wherein the form defines
      a user interface of an application,
      an external view of an entity,
      which fields are visible in the external view of the entity, whether the external of the entity allows one of a read, a modify, an insert and a delete function to be operated on the entity, and whether particular fields in the external view of the entity are one of read-only or editable;

receiving from the service client a Web Service Description Language (WSDL) request for a description of the service;

retrieving form metadata regarding the form on the application server;

determining from the form metadata what fields from what tables are shown on the form;

retrieving table metadata regarding properties of the fields; and using the form metadata and the table metadata to respond to the WSDL request with a description of the service in the WSDL format.

10. The computer readable medium of claim 9, wherein abstractions intended to be web accessible as a web-service are registered in the database table and wherein the discovery subsystem is populated from the database table.

11. The computer readable medium of claim 9, wherein the web service entry in the response contains a Uniform Resource Locator (URL) pointing to a WSDL description of the service.

12. A computer system comprising a processor for executing computer executable code, a memory for storing computer executable code and an input/output circuit, the computer executable code further comprising code for deriving web service interfaces from form and table metadata, wherein the computer code further comprises code for:

receiving from a service client at a discovery subsystem a first request for services that are available on an application server;

responding to the first request with a web service entry corresponding to a form registered in a database table as a service, wherein the form defines a user interface of an application, an external view of an entity, which fields are visible in the external view of the entity, whether the external view of the entity allows one of a read, a modify, an insert and a delete function to be operated on the entity, and whether particular fields in the external view of the entity are one of read-only or editable;

receiving from the service client a Web Service Description Language (WSDL) request for a description of the service;

retrieving form metadata regarding the form on the application server;

determining from the form metadata what fields from what tables are shown on the form;

retrieving table metadata regarding properties of the fields;

building an XML type comprising a name of the service and a field corresponding to each of the fields shown on the form using a name and type of the field from the table metadata; and responding to the WSDL request with a description of the service in the WSDL format comprising the XML type.

* * * * *